Patented Oct. 2, 1923.

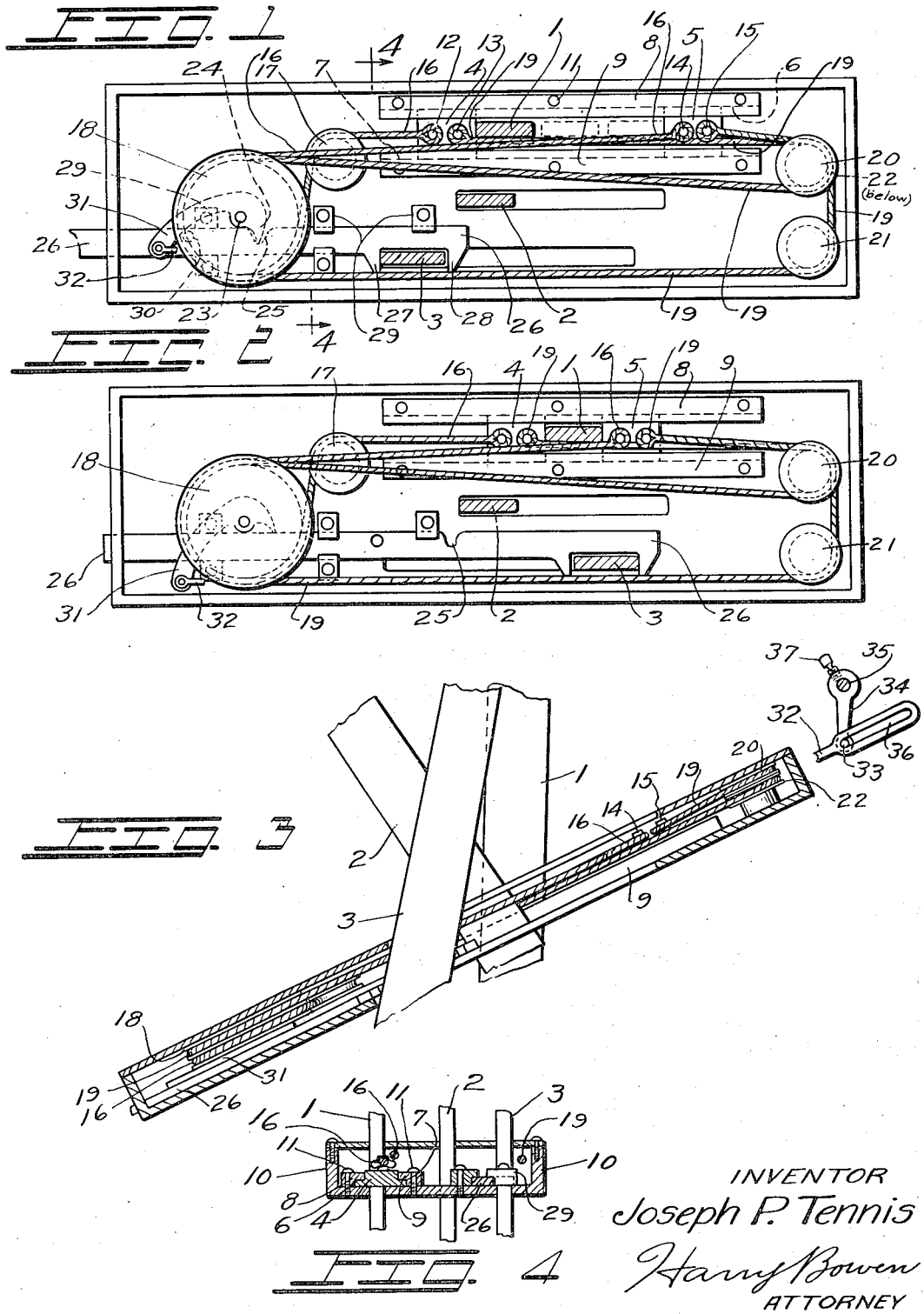

1,469,462

UNITED STATES PATENT OFFICE.

JOSEPH P. TENNIS, OF SEATTLE, WASHINGTON.

SAFETY APPLIANCE.

Application filed October 31, 1922. Serial No. 598,111.

*To all whom it may concern:*

Be it known that I, JOSEPH P. TENNIS, a citizen of the United States, residing at Seattle, county of King, and State of Washington, have invented a new and useful Safety Appliance; and I do hereby declare that the following is a full, clear, and exact specification, such as will enable others skilled in the art to which it appertains to make and use the same.

The invention is a device for automatically bringing the clutch of a motor vehicle to the neutral position and for partly closing the throttle valve as the brake is applied.

The object of the invention is to provide a device which will automatically throw a motor vehicle out of gear as the foot brake is applied.

Another object of the invention is to provide an attachment which will automatically cut down the supply of gas to the engine as the foot brake is applied.

And a further object of the invention is to provide a device which will automatically throw a motor vehicle out of gear and shut down the supply of gas as the foot brake is applied, that may be installed between the inclined portion of the floor and the transmission cover.

With these ends in view the invention embodies a pair of slides held in grooves in a suitable casing at the front and rear of the clutch lever and a drum with suitable cables for operating the slides, which drum is operated by a lever from the brake lever. It also embodies a rod also operated from the brake lever which may be attached through suitable levers to the throttle valve.

Other features and advantages of the invention will appear from the following description taken in connection with the drawings, wherein:—

Figure 1 is a plan view with the cover omitted.

Figure 2 is a similar view showing the brake lever moved forward and the clutch lever in the neutral position.

Figure 3 is a side elevation with parts removed.

Figure 4 is a cross section on line 4—4 of Figure 1.

In the drawings I have shown my device as it would be constructed wherein numeral 1 indicates the clutch lever, numeral 2 the reverse lever and numeral 3 the brake lever of a Ford motor vehicle.

Behind the lever 1 is a slide 4 and in front of it is another slide 5 both of which are held in the grooves 6 and 7 of the bars 8 and 9 and the bars are held to the casing 10 by the screws 11. On the plate 4 are two pins 12 and 13 and on the plate 5 are also two pins 14 and 15, to which the cables for operating the plates are connected. A cable 16 is connected to the pin 12 and then passes over a wheel 17 from where it goes to the drum 18 and from there it passes to the pin 14 to which it is also connected. Another cable 19 is attached to the pin 13 and extends from there around the wheel 20, around the drum 18, around the wheel 21 and around the wheel 22, which is on the same pin as the wheel 20, to the pin 15. Each of the wheels are pivotally mounted on pins in the casing 10 and the drum is supported on a pin 23 also in the casing 10. A pawl 24 is also rotatably mounted on the pin 23 and in the normal position fits into a notch 25 in a bar 26 which engages the brake lever 3 through the projections 27 and 28. The bar 26 is held to the casing by lugs 29 which have grooves in them that permit the bar to slide back and forth. A pin 30 projects upward from the bar 26 and as the bar moves backward from the position shown in Figure 2 to that shown in Figure 1, this pin engages the lever 31 on the pawl 24 and moves it backward so that the pawl will move into the notch 25.

It will be seen that as the brake lever 3 moves forward from the position shown in Figure 1 to that shown in Figure 2 the bar 26 will move with it and as it moves it will cause the pawl 24 to rotate in a counter-clockwise direction about the pivot 23 so that it will move from the position shown in Figure 1 to that shown in Figure 2; and as the drum 18 is also mounted upon the pin 23 it will rotate with the pawl and move the cables 16 and 19. It will also be seen that as the cable 16 moves in this direction it will pull the pin 14 towards the drum and as the cable 19 moves in this direction it pulls the pin 13 away from the drum, thus drawing the plates 4 and 5 toward each other. Then as the brake is released so that it will return to its normal position the bar 26 will move backward so that the pin 30 will engage the lever 31 and rotate the drum in the opposite direction, and it will be seen that as the drum moves back to its normal position the cables will draw the plates 4 and 5 away from each other to the position shown in Figure 1.

A bar 32 may be attached to the end of the lever 31 and this may pass forward so that it will engage a pin 33 on a lever 34 which may be attached to a rod 35 through which the throttle valve is operated. In the end of the rod 32 is a slot 36 through which the pin 33 projects and this slot permits the shaft 35 to be moved in the ordinary manner without moving the rod 32 while at the same time the rod 32 will twist the shaft 35 as the lever 31 moves forward when the brake is applied. As the lever 34 is held to the shaft 35 by a set screw 37 it may be adjusted so that as the foot lever is applied the throttle valve may be closed to any desired position.

It will be understood that changes may be made in the construction without departing from the spirit of the invention. One of which changes may be in the use of any type of flexible chain or belt instead of the cables 16 and 19 and in the use of sprockets or pulleys in place of the wheels shown, another may be in the design of the plates 4 and 5 or in the use of any other means for holding them so that they may move backward and forward, and still another may be in the use of any desired means for operating the drum 18 from the foot lever 3.

The construction will be understood from the foregoing description. To use the device it may be installed between the inclined floor and the transmission cover of the motor vehicle so that the brake, reverse, and clutch levers will project up through it. Then as the brake is applied the plates 4 and 5 will be drawn together as hereinbefore described and the clutch lever 1 which is between them will be moved to the neutral position as shown in Figure 2. It will be seen that as there are two plates and as both of them move toward the center the lever will be drawn to the neutral position from either the high or low speed position. As the brake is released both of the plates will move away from the lever to the positions shown in Figure 1 as hereinbefore described and the clutch lever will be free so that it may be moved in either direction. It will also be seen that as the brake is applied the rod 32 will operate the throttle so that the supply of gas to the engine may be cut down to any desired amount.

Having thus fully described the invention, what I claim to be new and desire to secure by Letters Patent, is:—

1. A device of the class described embodying slides supported in grooves in a suitable casing, said casing being constructed so that it may be placed around the clutch and brake levers of a motor vehicle in such a manner that the two slides may engage the clutch lever; suitable means for moving the slides together as the brake is applied which will also move them away from each other as the brake is released and other means for partly closing the throttle valve as the brake is applied.

2. A safety appliance of the class described embodying a pair of slides mounted in a suitable casing adjacent a clutch lever of a motor vehicle; and means for moving the slide so that they will move the clutch lever to the neutral position as the brake is applied and so that they will release it when the brake is released.

3. A safety appliance of the class described embodying a pair of slides supported in a suitable casing so that one of them will be in the front of the clutch lever of a motor vehicle and the other behind it; means for drawing the slides together as the brake is applied and for moving them apart as the brake is released; and a suitable means for partly closing the throttle valve as the brake is applied.

4. A safety appliance of the class described embodying a casing that may be placed on top of the transmission cover of a motor vehicle, which casing has slots in it through which the brake, reverse and clutch levers may pass; two plates, one in front of the clutch lever and the other behind it; bars with slots in them in which the plates may slide; pins on the plates; a cable attached to one of the pins on one of the plates, then passing around a wheel and a drum and from the drum to a pin on the other plate; another cable passing from a pin on the first mentioned plate, around two wheels, around the drum and then around another wheel and back to a pin on the latter plate; a pawl on a shaft on which the drum is mounted; a bar with a notch in it into which the pawl may project, a lug on it for engaging a lever on the pawl and a projection on it for engaging the brake lever; lugs with grooves in them for holding the bar so that it may slide backward and forward; a rod with a slot in one end which is attached to the end of the pawl lever; and a lever with a set screw in its hub and a pin in its opposite end for engaging the slot in the rod, said lever being constructed so that it may be placed on the throttle control rod.

JOSEPH P. TENNIS.